United States Patent [19]

Flöther et al.

[11] Patent Number: 5,194,988
[45] Date of Patent: Mar. 16, 1993

[54] DEVICE FOR CORRECTING PERSPECTIVE DISTORTIONS

[75] Inventors: Werner Flöther; Winfried M. Kaiser, both of Aalen, Fed. Rep. of Germany

[73] Assignee: Carl-Zeiss-Stiftung, Heidenheim/Brenz, Fed. Rep. of Germany

[21] Appl. No.: 752,822

[22] Filed: Aug. 30, 1991

Related U.S. Application Data

[63] Continuation-in-part of Ser. No. 505,173, Apr. 5, 1990, Pat. No. 5,044,728.

[51] Int. Cl.⁵ .......................... G02B 7/02; G02B 27/64
[52] U.S. Cl. ................................. 359/554; 359/813; 359/815
[58] Field of Search ........................ 359/811–827, 359/414, 554, 557; 354/123, 354; 355/52, 53, 69, 74

[56] References Cited

U.S. PATENT DOCUMENTS

| | | | |
|---|---|---|---|
| 2,931,268 | 4/1960 | Gelb | 355/69 |
| 3,713,725 | 1/1973 | Uesugi | 359/813 |
| 3,825,938 | 7/1974 | Koch | 355/52 |
| 3,839,684 | 10/1974 | Matsuoka et al. | 359/813 |
| 4,081,812 | 3/1978 | Flöther | 359/813 |
| 4,160,581 | 7/1979 | Weissler | 359/813 |
| 4,437,730 | 3/1984 | Pickett | 359/813 |
| 4,521,076 | 6/1985 | Weber et al. | 350/254 |
| 4,909,617 | 3/1990 | Boyd | 359/813 |

FOREIGN PATENT DOCUMENTS

| | | |
|---|---|---|
| 2855496 | 7/1980 | Fed. Rep. of Germany . |
| 3436886 | 4/1986 | Fed. Rep. of Germany . |
| 8608623 | 7/1986 | Fed. Rep. of Germany . |
| 2012974 | 8/1979 | United Kingdom . |

Primary Examiner—Bruce Y. Arnold
Assistant Examiner—James Phan
Attorney, Agent, or Firm—Walter Ottesen

[57] ABSTRACT

The invention relates to an arrangement known generally as a PC-adapter or shift adapter. The objective is mounted on one component of the arrangement which can undergo a pivot movement relative to the image format thereby making possible the necessary movement of the objective relative to the image format. The pivot point is disposed as far as possible from the optical axis and outside of the beam pass-through opening of the arrangement.

3 Claims, 8 Drawing Sheets

DEVICE FOR CORRECTING PERSPECTIVE DISTORTIONS

RELATED APPLICATION

This is a continuation-in-part of application Ser. No. 505,173, filed on Apr. 5, 1990, now U.S. Pat. No. 5,044,728, and entitled "Device for Correcting Perspective Distortions".

BACKGROUND OF THE INVENTION

Apparatus for correcting perspective distortions are known as PC-objectives or (perspective-control objectives) shift objectives when the imaging optical system is configured as an objective. These apparatus compensate for perspective distortions such as tumbling lines. Objectives of this kind are known and can be displaced vertically, horizontally and diagonally on the camera and are used to correct perspectives for pictures primarily in architectural and industrial photography.

U.S. Pat. No. 2,931,268 discloses an apparatus wherein two plates are mounted in respective dove-tail guides wherein they can be displaced relative to the film plane with spindles selectively in the x or y direction. This type of plate movement requires a substantial amount of space and is very expensive since many parts having very tight tolerances relative to each other are required. This applies in the same manner to objectives having a coupling device disclosed in published British patent application No. 2,012,974.

U.S. Pat. No. 4,081,812 discloses a photographic objective wherein the dove-tail guide is avoided.

In the photographic lens of U.S. Pat. No. 4,081,812, rotational rings are provided between an adjusting frame of the objective and a swing-angle transmission system for movement in the x and y directions with these rotational rings being disposed one over the other. The center ring is fixedly mounted so as to be centered to the camera and the radial and axial guide is defined by two further rings. These two further rings transmit with their rotation the movement to the adjusting frame of the objective via control curves and connecting parts. The high space requirement and the problem of the very tight tolerances here too do not provide an optimal solution. The same applies for the so-called shift adapter disclosed in German Patent No. 3,436,886 wherein the shift adapter is disclosed as being mounted between the objective and the camera.

U.S. Pat. No. 3,713,725 discloses a PC-objective wherein the adjustment perpendicular to the optical axis takes place by means of two interconnected eccentric rings. The space requirement is less than the other solutions discussed above but the tolerance problem is shifted from many linear surfaces to rounded surfaces without a substantial reduction of the surfaces which have to be precisely machined. Furthermore, only a very small adjusting range can be realized with this PC-objective.

SUMMARY OF THE INVENTION

It is an object of the invention to provide a device for correcting perspective distortions by displacing an imaging optical system in a plane perpendicular to its optical axis. It is a further object of the invention to provide such a device which requires only a minimal number of surfaces which have to be precisely machined with the largest possible manufacturing tolerances. It is still another object of the invention to provide a device for correcting perspective distortions with relatively little optical and mechanical complexity.

The device of the invention is for correcting perspective distortions in an arrangement which includes an apparatus having a beam pass-through opening and which includes an imaging optical system defining an optical axis and an image plane, the apparatus also defining an optical axis and having an image carrier in the image plane of the optical system. The device includes: a holding structure mounted on the apparatus and being disposed outside of the beam pass-through opening; displacement means for effecting a displacement of the axes relative to each other to correct the distortions; the displacement means being mounted on the structure to permit the displacement to occur in a plane transverse to the axes; the optical system being mounted on the displacement means so as to be displaceable therewith and relative to the apparatus; the optical system including a lens assembly having an image field angle; the displacement means including an intermediate opening between the lens assembly and the image plane; and, an adapter lens unit mounted in the intermediate opening for increasing the image field angle.

The image carrier of the arrangement according to the invention can be a photographic layer, a light-sensitive linear sensor, a light-sensitive surface sensor or the like.

The position of the pivot point provided in the arrangement of the invention is disposed outside of the beam pass-through opening of the apparatus, that is, outside of the imaging optical system. With this position of the pivot point, the tolerances for the pivot movement of the system can be held to be relatively large.

According to another feature of the invention, the only tolerances which are significant are between the two planar surfaces perpendicular to the optical axes.

A pivot movement takes place at these planar surfaces which causes the optical axis of the imaging system to be displaced relative to the optical axis of the apparatus, which could, for example, be a camera. The needed space is minimal because of the low number of surfaces which have to be precisely machined and a simple assembly is made possible. This all leads to low production costs even though a very large displacement or stroke can be realized notwithstanding the compact configuration.

The arrangement according to the invention is advantageously configured as an adapter so that existing camera housings and objectives can be utilized. By seating at least one of the lenses in the adapter, the influence in the apparatus can be compensated which is introduced by the increased distance between objective and image plane and a required increase in the image angle can be realized. An increase of the diameter of the image circle is then also realized. However, the entire objective can be integrated into an adapter.

It is advantageous to provide a releasable fixing device having a scale at the end lying opposite the pivot point in order to assure a precise relative movement of the optical axes of objective and camera. The fixing device is advantageously configured as a combined adjusting and fixing threaded fastener.

BRIEF DESCRIPTION OF THE DRAWINGS

The arrangement of the invention will now be described with reference to the drawings wherein.

DESCRIPTION OF THE PREFERRED EMBODIMENTS OF THE INVENTION

Figure 1:
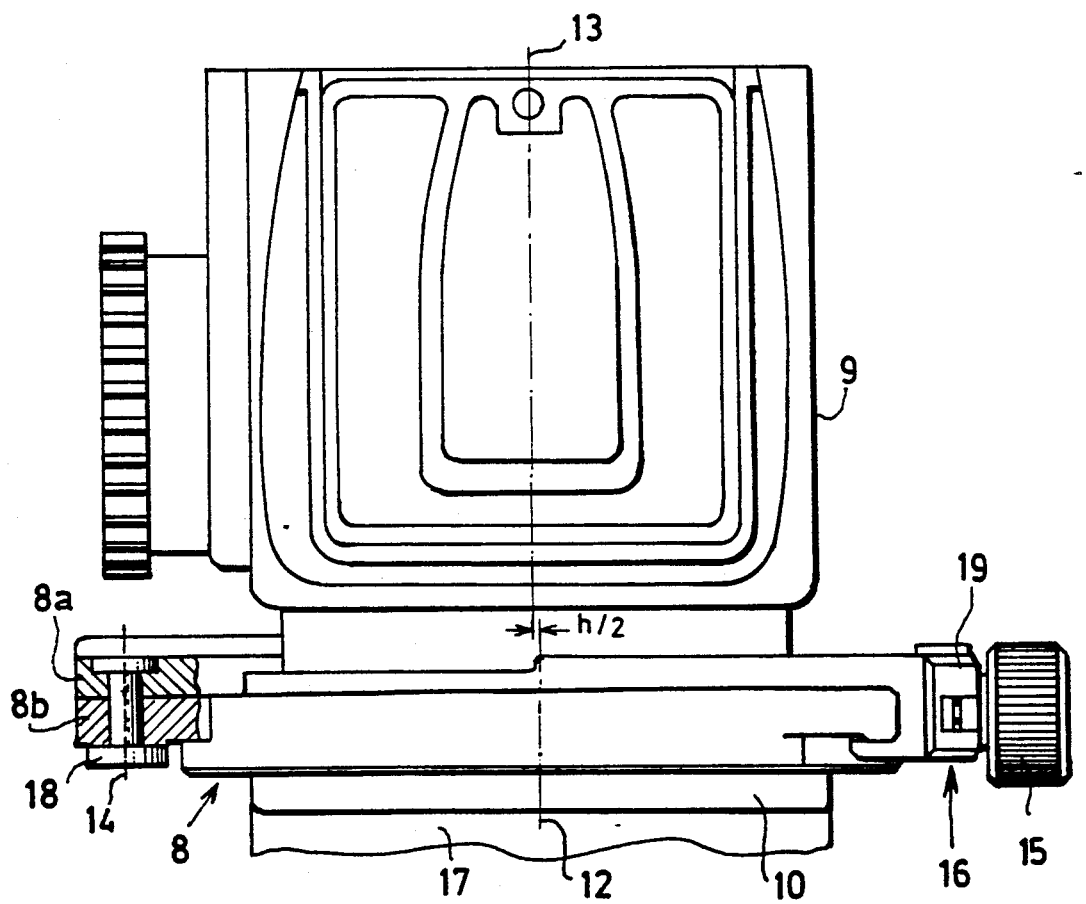
FIG. 1 is a side elevation view of a shift adapter mounted on a camera.
Figure 2:
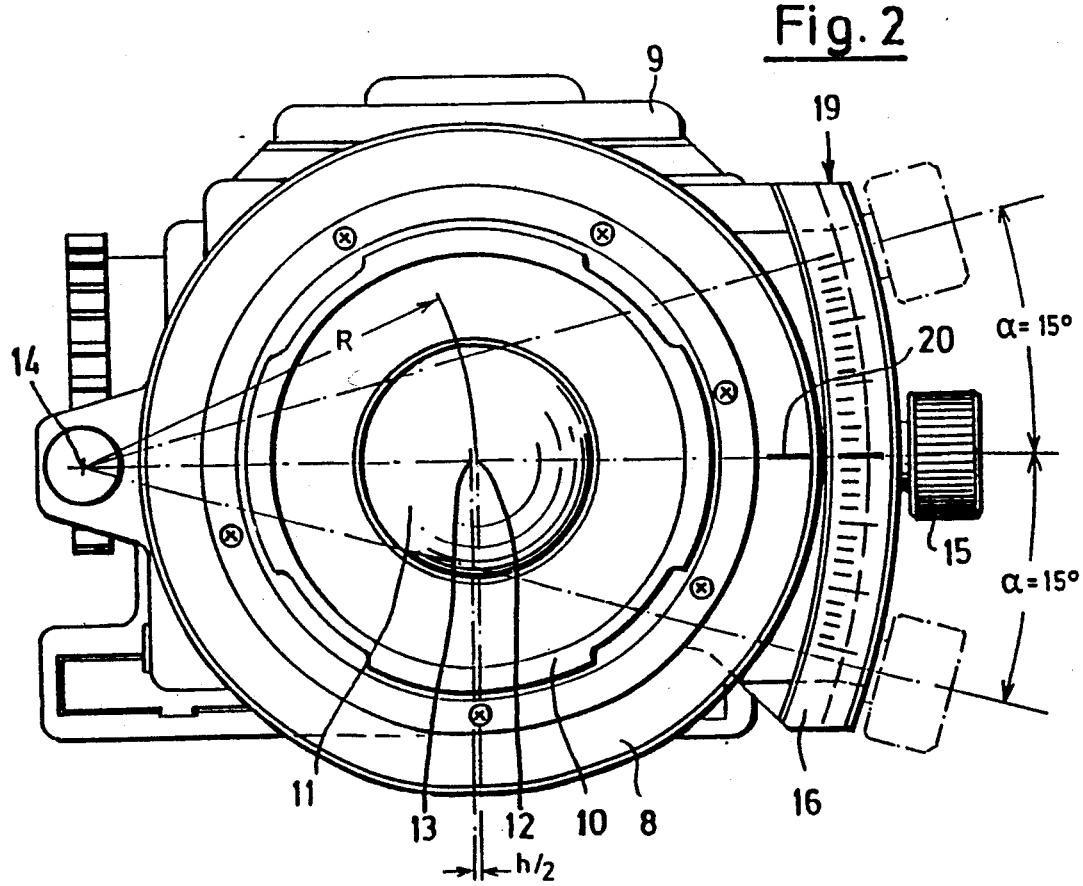
FIG. 2 is a front elevation view of the shift adapter shown in FIG. 1.

In FIGS. 1 and 2, a camera housing is identified by reference numeral 9 on which a shift adapter 8 is mounted so as to be releasable by a fixing device, for example, a lock. The camera housing 9 is a conventional housing on which an objective is releasably mounted. A further fixing device 10 is provided on the end of the shift adapter 8 lying opposite the camera housing 9. This additional fixing device 10 can, for example, be a bayonet connector on which a wide-angle objective 17 is mounted.

Figure 7:
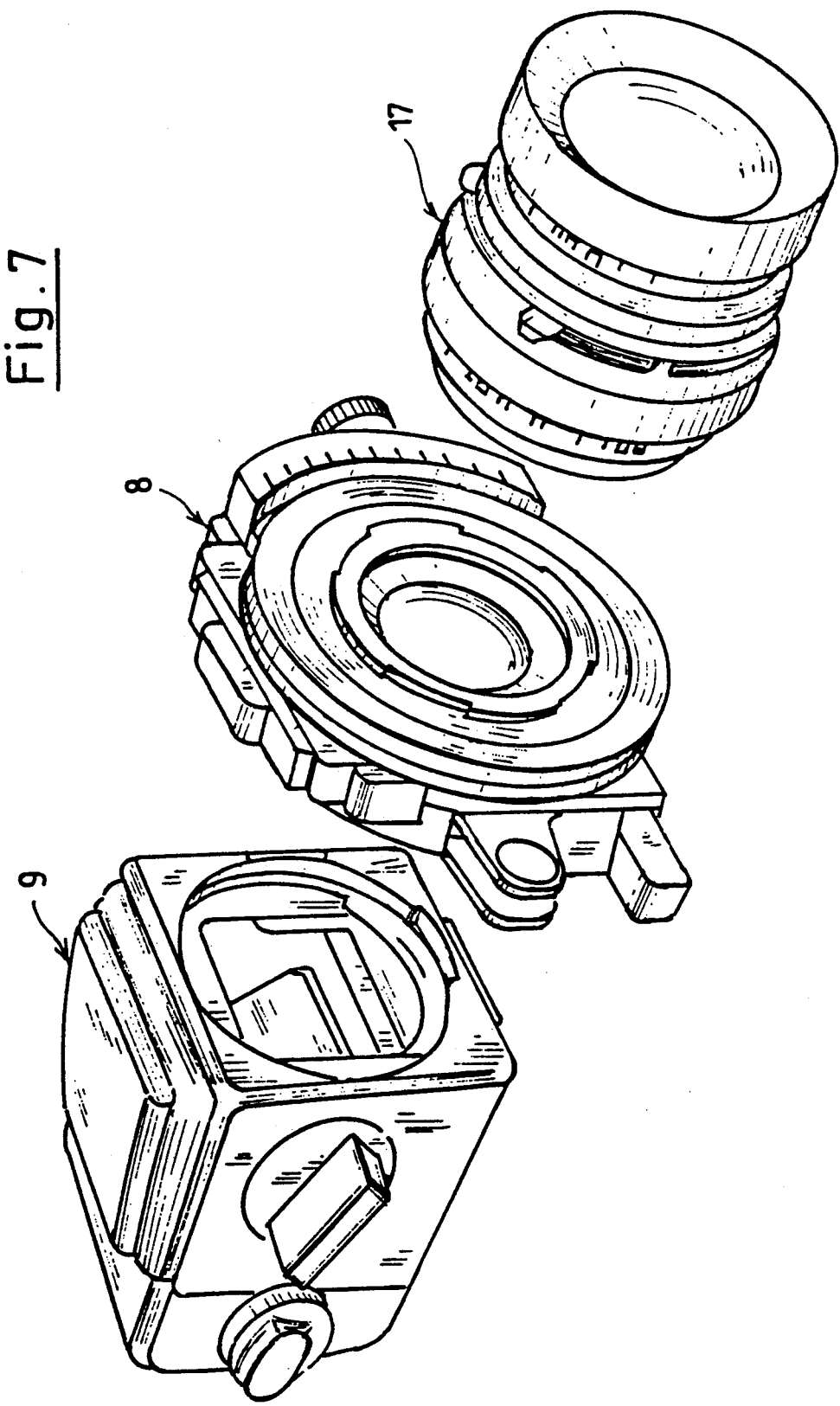
FIG. 7 is an exploded perspective view showing the camera housing, adapter containing an adapter lens unit and an objective.

The shift adapter 8 is shown between the camera housing 9 and objective 17 in the exploded perspective view of FIG. 7.

The imaging circle diameter in the plane of the film in the camera housing 9 must be made sufficiently large so that the wide-angle objective 17 can be used on the shift adapter 8. This is explained in greater detail in connection with FIG. 3. A lens unit 11 is mounted in the beam pass-through opening 2 of the shift adapter 8 so that the objective 17 includes the image format 4 in the camera housing 9 in its image circle in every position of a plate-shaped body 8b of the shift adapter 8 as will also be explained with respect to FIG. 3. The lens unit 11 magnifies the image circle diameter of the objective 17 by the required amount.

Figure 9:
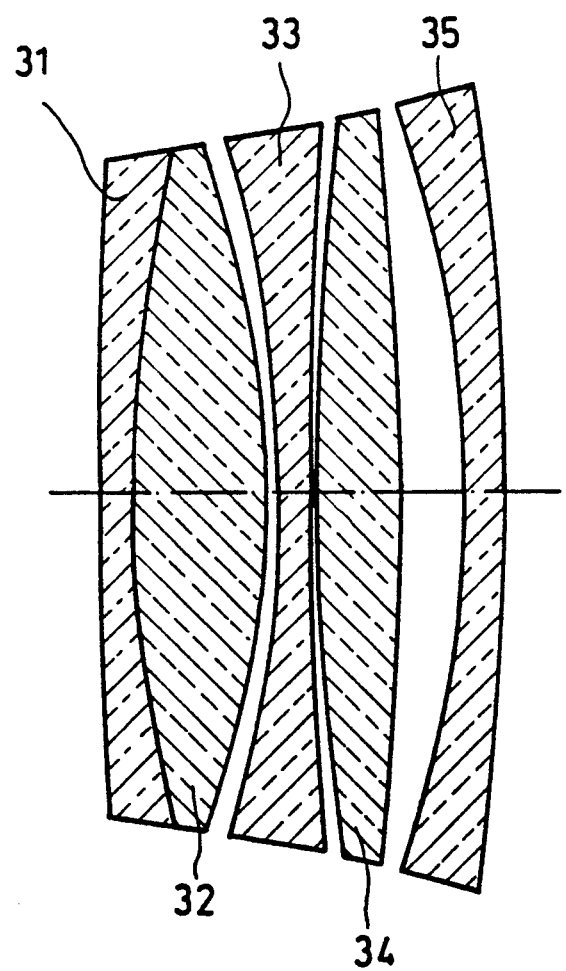

The lens unit 11 is mounted in the plate-shaped body 8b of the adapter 8 and includes the five lenses 31 to 35 shown in FIG. 9. The optical data for the lens unit shown in FIG. 9 is provided in the following table.

|  | Radius | Thickness | Refractive Index | Abbe Number |
|---|---|---|---|---|
| Lens 31 | 282.323 | 1.443 | 1.835 | 43.0 |
|  | 56.710 |  |  |  |
| Adhesive Gap |  | 0.0 |  |  |
| Lens 32 | 56.710 | 6.083 | 1.601 | 38.2 |
|  | −40.481 |  |  |  |
| Air Gap |  | 0.502 |  |  |

-continued

|  | Radius | Thickness | Refractive Index | Abbe Number |
|---|---|---|---|---|
| Lens 33 | −51.576 | 1.432 | 1.835 | 43.0 |
|  | 199.534 |  |  |  |
| Air Gap |  | 0.290 |  |  |
| Lens 34 | 108.734 | 3.868 | 1.626 | 35.7 |
|  | −128.362 |  |  |  |
| Air Gap |  | 2.923 |  |  |
| Lens 35 | −47.085 | 1.676 | 1.782 | 37.2 |
|  | −117.657 |  |  |  |

Linear Magnification: 1.45×
Focal Length: −175.75

The Abbe number in the last column is a value indicative of the dispersion of the optical material of which the lens is made.

The shift adapter 8 essentially comprises two plate-shaped bodies (8a, 8b). One of these bodies 8a is permanently but releasably connected to the camera housing 9. The objective 17 is seated in the other body 8b by means of the bayonet connector 10.

The two plate-shaped bodies (8a, 8b) have a permanent rotatable connection in one point 14 by means of a releasable self-locking pin 18. The attachment pivot point 14 lies laterally of both plate-shaped bodies (8a, 8b) and permits these bodies (8a, 8b) to be moved relative to each other about the point 14. The location of the pivot point 14 at the lateral edge of both bodies (8a, 8b) is essential for the operation of the shift adapter 8. It is only because the point 14 has an extreme lateral location, that a still acceptable center offset with a relatively large stroke can be realized. The lateral location of the pivot point 14 advantageously affects the manufacturing tolerances since these can be relatively wide for a guide having a large spacing with respect to the optical axis 12.

The configuration described permits the adapter 8 to be realized with a minimum number of parts whereby a narrow space requirement results.

On the side lying opposite the pivot point 14, one of the bodies, namely body 8a, engages about the other plate-shaped body 8b and provides a guide for this body 8b on which the objective 17 is mounted. The body 8a is attached to the camera housing 9. This additional guide increases the stability of the adapter 8 and provides relief from forces for the pin 18 and especially against forces resulting from impact blows. For this reason, the guide is so configured that the forward plate-shaped body 8b can move easily in the guide with only slight play.

A releasable fixing device 15 is mounted on the side lying opposite the pivot point 14 so that the objective 17 cannot by itself become displaced relative to the camera housing 9. This fixing device 15 is permanently connected to the forward plate-shaped body 8b and engages the guide 19 through a lateral opening. This lateral opening is closed at the ends of the guide 19 and limits the displacement possibility of both plate-shaped bodies (8a, 8b).

The fixing device 15 is so constructed that the fixation can be released by a slight pull of the fixing screw. In this condition, both plate-shaped bodies (8a, 8b) pivoted relative to each other. With this movement, that part of the fixing device 15 which is permanently connected to the forward plate-shaped body 8b serves as an adjusting lever. If the fixing device 15 is released, then this device assures a fixation of both plate-shaped bodies (8a, 8b) to each other. For this reason, the fixing device 15, when disengaged, is at the same time an adjusting device for the position of both bodies (8a, 8b) to each other.

A scale 16 having graduations is provided on the guide 19 so that the position of both plate-shaped bodies (8a, 8b) relative to each other can be read off in order that this position can be documented for photographs which have been made. An index mark 20 corresponding to the scale 16 is applied to the forward plate-shaped body 8b so that the adjusted stroke can be read off.

Figure 4:
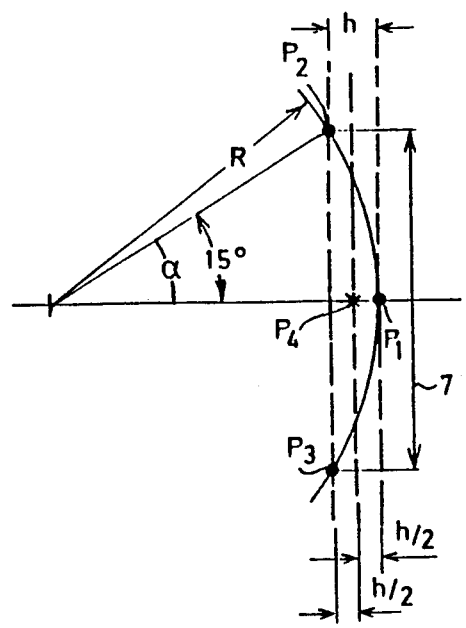
FIG. 4 is a detail view for explaining the influence of the pivot movement of the shift adapter.

The optical axis 12 of the adapter 8 and thereby the objective 17 is slightly offset relative to the optical axis 13 of the camera housing 9. This offset corresponds to half the mid-offset (h/2) as will be explained relative to FIGS. 3 and 4.

Figure 3:
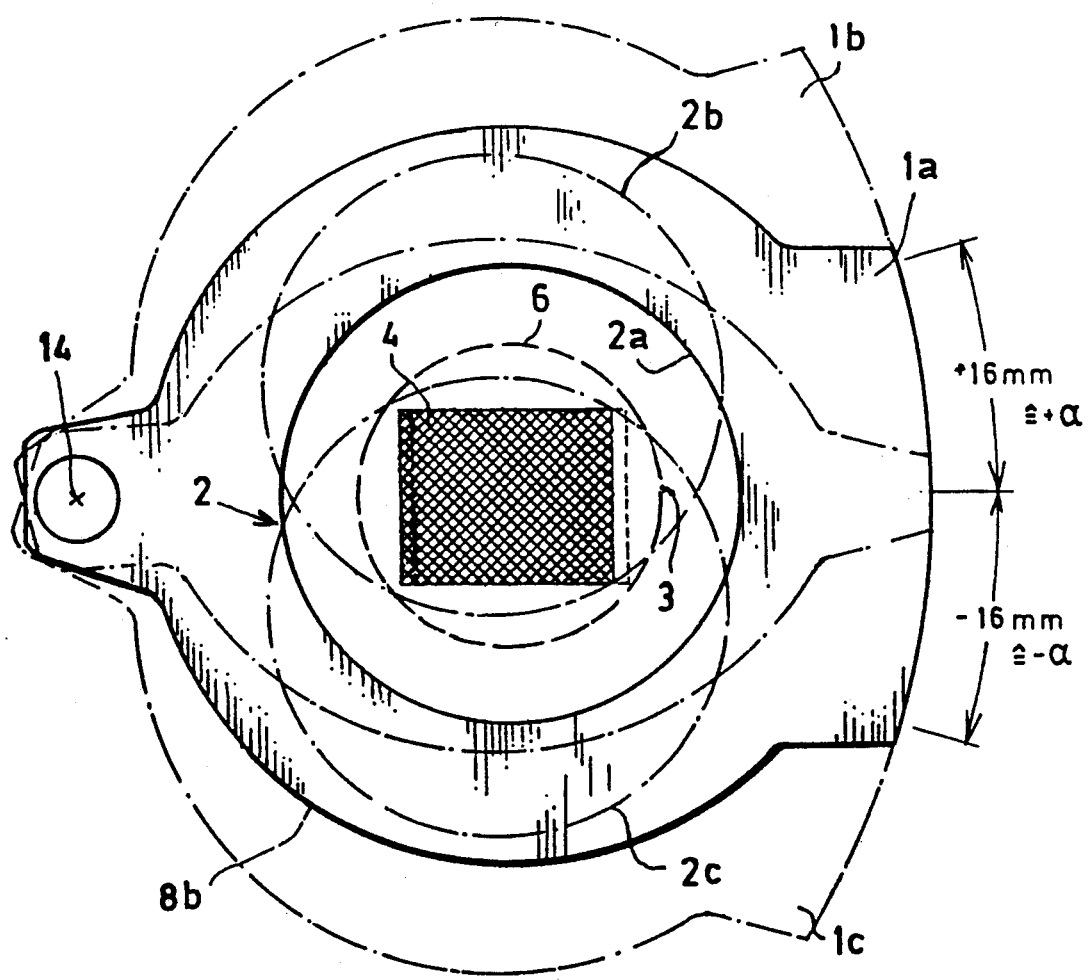
FIG. 3 is a schematic representation of the movement of a shift adapter.

In the schematic representation of FIG. 3, the body 8b of the shift adapter 8 carries the objective 17 and is shown in three different positions (1a, 1b, 1c). The opening 2 of the body 8b is circular and accommodates the objective 17. This opening 2 overlaps itself in a region 3 in the pivot positions (1a, 1b, 1c). The opening 2 is identified in FIG. 3 by circle 2b for the plate 8b in position 1b and by circle 2c for the plate 8b in position 1c. In this region 3, the image format 4 lies in the camera housing 9.

The required size of the opening 2 is a function of the following: the size of the image format 4, the magnitude of the spacing R (see FIG. 4) of the center point of this opening 2 from the pivot point 14 and the magnitude of the pivot angle $\alpha$ for given optical characteristics of the objective 17. The pivot point 14 lies as far as possible from the center point of the opening 2. The area of the image format 4 must never drift out of the area of the central opening 2 of the body 8b so that for each position of the beam pass-through opening 2, an illumination of the entire image format 4 is possible. In this way, the pivot angle $\alpha$ is determined for a given magnitude of the image format 4. This angle $\alpha$ gives the maximum angular displacement of the body 8b from its normal position 1a in the positive and negative directions. The diameter of the central opening 2 must be greater in the shift adapter 8 than for a normal objecting so that the area of the image format 4 always lies int he area of the central opening 2 irrespective of the position (1a, 1b or 1c) of the plate-shaped body 8b. The image circle diameter 6 of a normal objective 17 is shown in FIG. 3 to provide a size comparison. The lens unit 11 (FIG. 2) provided in the shift adapter 8 enlarges the image circle diameter 6 of the normal objective 17.

The image-enlarging lens unit 11 performs the following functions: it increases the image field; the distance between the objective 17 and the plane 30 of the film is increased to facilitate accommodating the mechanical structure of the adapter; and, the image brightness and image sharpness is maintained with the lens unit 11 having a negative refractive power.

Figure 8A:
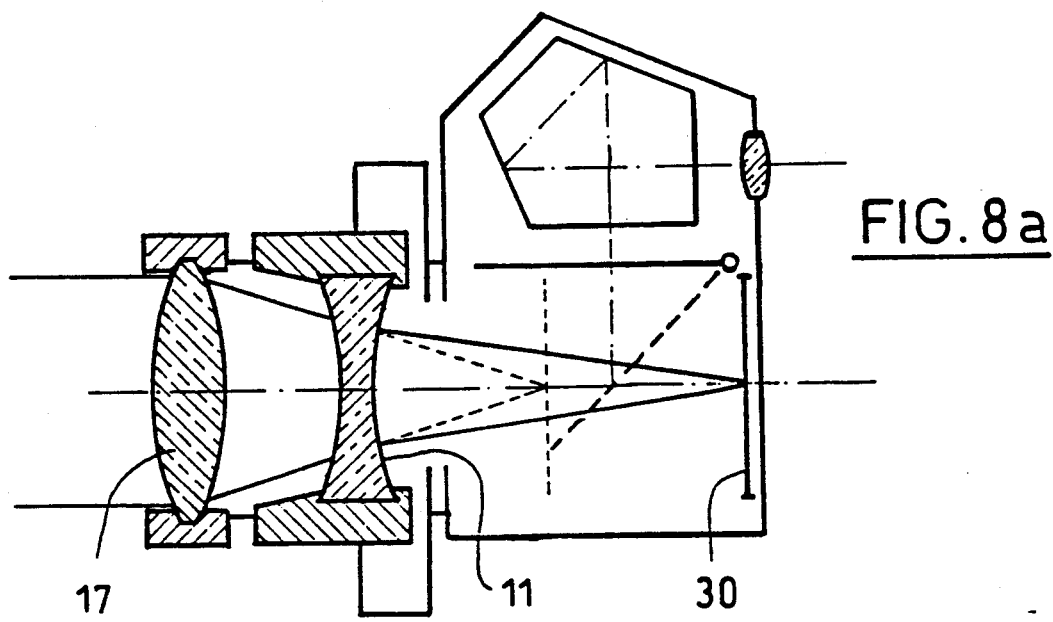
FIG. 8a is a side elevation schematic of the adapter mounted on a camera housing with the optical axis of the adapter coincident with the optical axis of the camera.
Figure 8B:
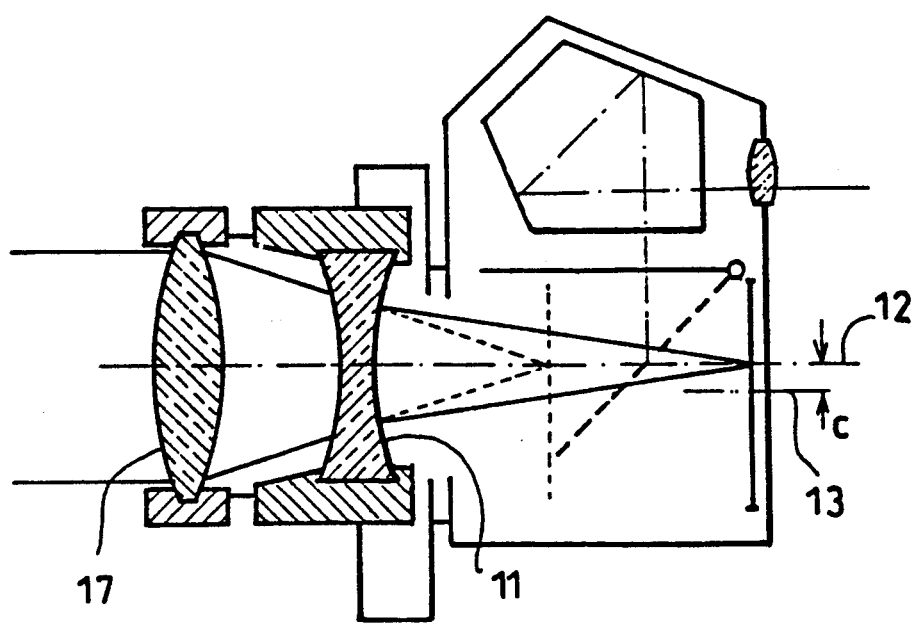
FIG. 8b is a side elevation schematic of the adapter and camera housing with the adapter optical axis shifted laterally with respect to the camera optical axis; and, FIG. 9 is a schematic showing a preferred lens configuration of the adapter lens unit.

That the pivotally mounted plate 8b effects a lateral displacement of the objective 17 and lens unit 11 is also shown by comparing FIGS. 8a and 8b. In FIG. 8a, the optical axis 12 of the adapter 8 is coincident with the optical axis 13 of the camera housing 9; whereas, in FIG. 8b, the plate 8b of the adapter 8 has been shifted to displace the optical axis 12 a distance (c) from the axis 13. Both objective 17 and lens unit 11 always have the same common optical axis 12.

Figure 6:
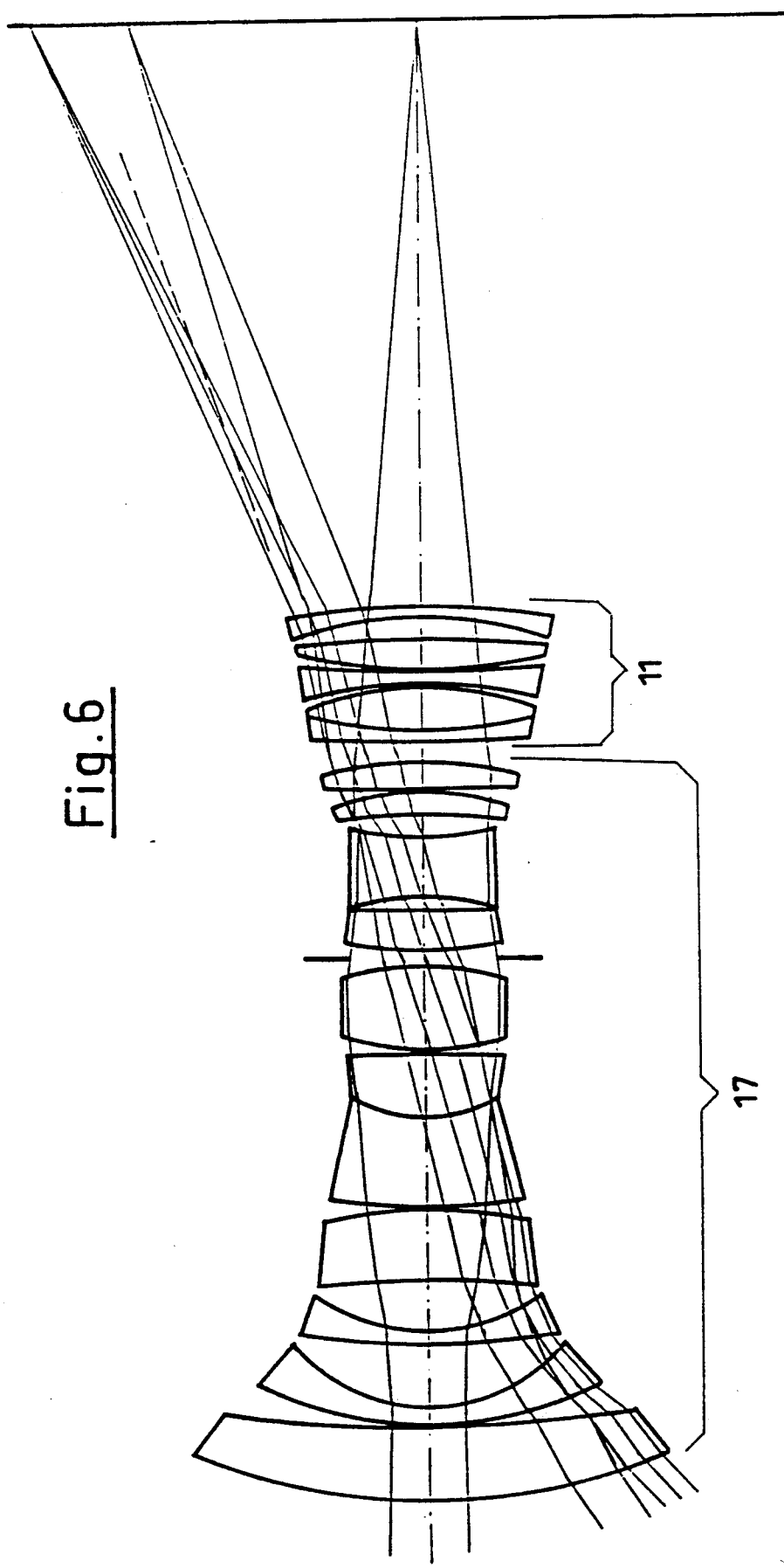
FIG. 6 shows a wide angle objective lens arranged adjacent an adapter lens unit mounted in the movable plate of the shift adapter.

FIG. 6 is a schematic showing the objective 17 as wide angle lens mounted adjacent the lens unit 11 shown in FIG. 9.

Figure 5:
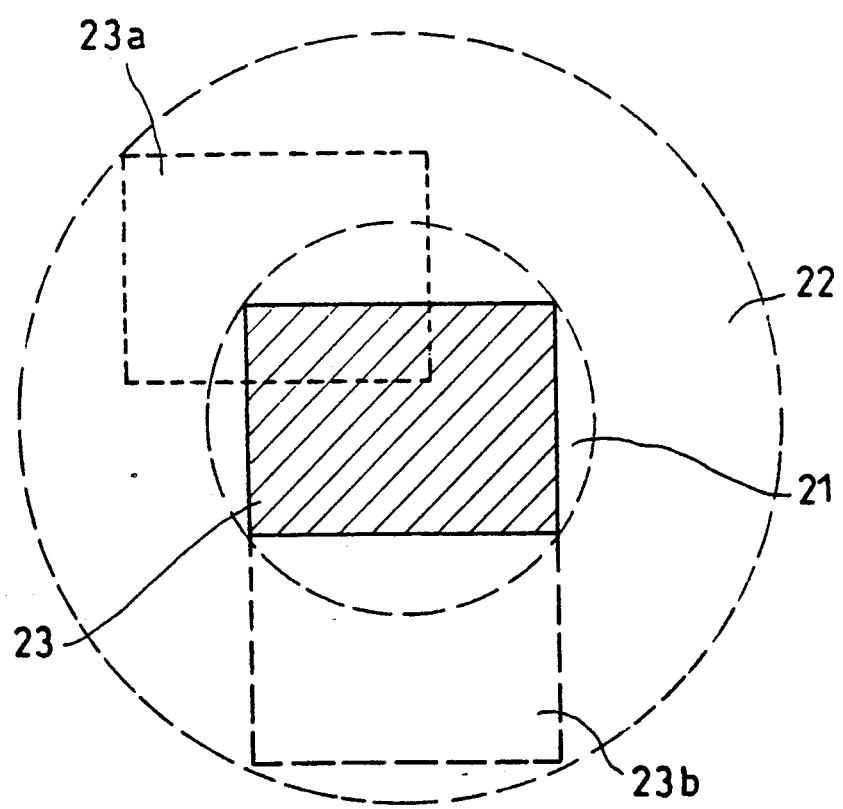
FIG. 5 is a schematic showing the image fields at the plane of a film in the camera housing obtained with and without a shift adapter.

In FIG. 5, reference numeral 21 identifies the image field without a shift adapter while reference numeral 22 identifies the image field with the shift adapter. A conventional adapter enlarges the image field with the edge region being blurred. By making the lens 17 an adequate size, this blurred edge region will no longer lead to an image on the image plane. This is useful since only the inner region is utilized in these adapters. However, in contrast to the above and still referring to FIG. 5, the shift adapter of the invention enlarges the image field 21 of the objective 17 also in the edge region so that the image on the image plane corresponding to the enlarged image field 22 is potentially useable in a larger surface than the image format 23 of the film. The smaller image format (23, 23a, 23b) can be moved within the enlarged image field 22 without the picture to be taken with camera being blurred and/or dark.

Referring again to FIG. 3, the center of the opening 2 moves along a chord of a circle and the center point defines the pivot point 14. For reason, the image format 4 must be mounted so as to be displaced by half the elevation of the circle section formed thereby in the direction of the pivot point 14. This will be more clearly explained with respect to FIG. 4.

The center point of opening 2 is identified by P1 for the normal position. If the body 8b is pivoted by the maximum possible value of the pivot angle (here $\alpha = \pm 15°$), then positions of the center points result in the maximum positions of the opening 2 and these center points are identified by P2 and P3. The center points of the opening 2 (P1, P2, P3) all lie on chords of a pivot circle which has its center point in the pivot point 14. This pivot circle has a circular radius R. The length of the circular arc and thereby the length of the circular chord 7 are determined by the positions of the center points (P2, P3) at maximum pivot displacement of the body 8b. This length is referred to as the stroke in shift adapters. Furthermore, the elevation of the circular section is determined in this way and this elevation can also be designated as the center offset (h). The center point of the opening 2 in the base position is displaced from P1 to P4 in order to obtain the smallest center offset for each position of the shift adapter 8. In this way, the condition is obtained that the center offset can only be $\pm h/2$.

In accordance with another embodiment of the shift adapter, an objective can also be inseparably connected to one of the plate-shaped bodies such as body 8b. A separate lens 11 for magnifying the image circle diameter is then not needed with an appropriate configuration of the objective 17.

Optical apparatus on which a shift adapter can be used are: movie cameras, cameras, projectors and the like. In this context, further positioning possibilities of the objective relative to the film format can be provided such as enlargements of the distances along the optical axis, rotations about the optical axis and pivot movements. The arrangement according to the invention significantly facilitates the realization of such combined movements since the shift adapter itself comprises only very few parts.

It is understood that the foregoing description is that of the preferred embodiments of the invention and that various changes and modifications may be made thereto without departing from the spirit and scope of the invention as defined in the appended claims.

What is claimed is:

1. A device for correcting perspective distortions in an arrangement which includes an apparatus having a beam pass-through opening and which includes an imaging optical system defining a first optical axis and an image plane, the apparatus defining a second optical axis and having an image carrier in the image plane of the optical system, the device comprising:
- pivot means disposed outside of said beam pass-through opening;
- displacement means for effecting pivotal displacement of said first optical axis and said second optical axis relative to each other about said pivot means to correct said distortions;
- said displacement means being mounted on said apparatus to permit said displacement to occur in a plane transverse to said first optical axis and said second optical axis;
- said displacement means including an adapter pivotally mounted on said pivot means and disposed between said apparatus and said optical system;
- said adapter including first and second plate-like bodies; said first body being mounted on said apparatus and said second body being pivotally mounted on said pivot means so as to be angularly displaceable relative to said first body;
- said optical system having an image field and being mounted on said second body so as to be pivotally displaceable therewith and relative to said apparatus;
- said second body including a beam pass-through opening and said optical system including a lens; and,
- said lens being mounted in said opening of said second body for increasing said image field.

2. A device for correcting perspective distortions in an arrangement which includes an apparatus having a beam pass-through opening and which includes an imaging optical system defining a first optical axis and an image plane, the apparatus defining a second optical axis and having an image carrier in the image plane of the optical system, the device comprising:
- pivot means disposed outside of said beam pass-through opening;
- displacement means for effecting a pivotal displacement of said first optical axis and said second optical axis relative to each other about said pivot means to correct said distortions;
- displacement means for effecting pivotal displacement of said first optical axis and said second optical axis relative to each other about said pivot means to correct said distortions;
- said displacement means being mounted on said apparatus to permit said displacement to occur in a plane transverse to said first optical axis and said second optical axis;
- said displacement means including an adapter pivotally mounted on said pivot means and disposed between said apparatus and said optical system;
- said adapter including first and second plate-like bodies; said first body being mounted on said apparatus and said second body being pivotally mounted on said pivot means so as to be angularly displaceable relative to said first body;
- said second body including a beam pass-through opening;
- said optical system having an image field and including a lens; and,
- said lens being mounted in said opening of said second body for increasing said image field.

3. A device for correcting perspective distortions in an arrangement which includes an apparatus having a beam pass-through opening and which includes an imaging optical system defining a first optical axis and a first image plane, the apparatus defining a second optical axis and having an image carrier defining a second image plane, the device comprising:
- a holding structure mounted on said apparatus and being disposed outside of said beam pass-through opening;
- displacement means for effecting a displacement of said first optical axis and said second optical axis relative to each other to correct said distortions;
- said displacement means being mounted on said structure to permit said displacement to occur in a displacement plane transverse to said first optical axis and said second optical axis;
- said optical system being mounted on said displacement means so as to be displaceable therewith in said displacement plane and relative to said apparatus and said second optical axis thereof;
- said optical system including a lens assembly having an image field;
- said displacement means including an intermediate opening between said lens assembly and said second image plane; and,
- an adapter lens unit mounted in said intermediate opening for increasing said image field.

* * * * *

UNITED STATES PATENT AND TRADEMARK OFFICE
CERTIFICATE OF CORRECTION

PATENT NO. : 5,194,988

DATED : March 16, 1993

INVENTOR(S) : Werner Flöther and Winfried M. Kaiser

It is certified that error appears in the above-identified patent and that said Letters Patent is hereby corrected as shown below:

In column 4, line 62: between "(8a, 8b)" and "pivoted", insert -- can be easily --.

In column 5, line 42: delete "objecting" and substitute -- objective -- therefor.

In column 5, line 43: delete "int he" and substitute -- in the -- therefor.

In column 6, line 20: between "For" and "reason", insert -- this --.

In column 7, line 10: between "effecting" and "pivotal", insert -- a --.

UNITED STATES PATENT AND TRADEMARK OFFICE
CERTIFICATE OF CORRECTION

PATENT NO. : 5,194,988

DATED : March 16, 1993

INVENTOR(S) : Werner Flöther and Winfried M. Kaiser

It is certified that error appears in the above-identified patent and that said Letters Patent is hereby corrected as shown below:

In column 7, delete lines 48 and 49.

In column 8, delete lines 1 and 2.

Signed and Sealed this

First Day of February, 1994

BRUCE LEHMAN

Attest:

*Attesting Officer*      *Commissioner of Patents and Trademarks*